(12) United States Patent
Akiyama et al.

(10) Patent No.: US 10,079,521 B2
(45) Date of Patent: Sep. 18, 2018

(54) MOTOR ACTUATOR

(71) Applicant: TGK CO., LTD., Tokyo (JP)

(72) Inventors: Tomohiro Akiyama, Tokyo (JP); Takashi Sannomiya, Tokyo (JP)

(73) Assignee: TGK CO., LTD., Tokyo (JP)

( * ) Notice: Subject to any disclaimer, the term of this patent is extended or adjusted under 35 U.S.C. 154(b) by 271 days.

(21) Appl. No.: 14/938,740

(22) Filed: Nov. 11, 2015

(65) Prior Publication Data

US 2016/0141933 A1    May 19, 2016

(30) Foreign Application Priority Data

Nov. 18, 2014   (JP) .................. 2014-234016

(51) Int. Cl.
*H02K 5/24*   (2006.01)

(52) U.S. Cl.
CPC ...................... *H02K 5/24* (2013.01)

(58) Field of Classification Search
CPC ........................................................ H02K 5/24
USPC .......................................................... 310/89
See application file for complete search history.

(56) References Cited

U.S. PATENT DOCUMENTS

| | | | | |
|---|---|---|---|---|
| 5,347,764 A * | 9/1994 | Pennison | ................ | B24B 23/00 451/322 |
| 5,979,405 A | 11/1999 | Sato et al. | ..................... | 123/399 |
| 2003/0201681 A1 | 10/2003 | Shimizu et al. | ................ | 310/51 |
| 2004/0245865 A1 * | 12/2004 | Ries | ....................... | B63H 5/125 310/52 |
| 2004/0248479 A1 * | 12/2004 | Hein | ...................... | B63H 5/125 440/6 |
| 2006/0181161 A1 | 8/2006 | Kawamoto et al. | ............ | 310/51 |
| 2007/0103010 A1 * | 5/2007 | Kouzu | ..................... | H02K 5/24 310/51 |
| 2011/0121667 A1 * | 5/2011 | Mori | ....................... | H02K 5/24 310/51 |

FOREIGN PATENT DOCUMENTS

| | | | | |
|---|---|---|---|---|
| JP | S55156549 U | 11/1980 | ............... | H02K 5/00 |
| JP | H08154358 A | 6/1996 | ............... | F16H 1/16 |
| JP | 04-039060 | 4/1999 | ............... | H02K 7/00 |

(Continued)

OTHER PUBLICATIONS

Chinese App. No. 201510700334.4, The First Office Action, and Search Report, English language, dated Apr. 4, 2018.

(Continued)

*Primary Examiner* — Naishadh Desai
(74) *Attorney, Agent, or Firm* — Martine Penilla Group, LLP

(57) ABSTRACT

A motor actuator includes a housing and an electric motor contained in the housing. The electric motor has a motor casing and a motor shaft protruding from a front face of the motor casing. The housing has a back wall behind a rear face of the motor casing. A gap space, which continues in a motor shaft direction, is formed between the back wall of the housing and the rear face of the motor casing. A counter region, which defines the gap space, is provided in the rear face of the motor casing. The motor actuator further includes a sound insulating member placed in the gap space, and covers the counter region in its entirety from behind.

9 Claims, 7 Drawing Sheets

(56) References Cited

FOREIGN PATENT DOCUMENTS

JP          2008-36065 A      2/2008    ............... A47L 9/00

OTHER PUBLICATIONS

Chinese App. No. 201510700334.4, The First Office Action, and Search Report, Chinese language, dated Apr. 4, 2018.
Japanese App. No. 2014-234016, Notification of Reason(s) for Refusal, English language, Dispatch No. 162858, dated Apr. 24, 2018.
Japanese App. No. 2014-234016, Notification of Reason(s) for Refusal, Japanese language, Dispatch No. 162858, dated Apr. 24, 2018.

* cited by examiner

MOTOR ACTUATOR

CLAIM OF PRIORITY

This application claims priority to Japanese Patent Application No. 2014-234016, filed on Nov. 18, 2014, of which is incorporated herein by reference.

BACKGROUND OF THE INVENTION

1. Field of the Invention

The present invention relates to a motor actuator.

2. Description of the Related Art

A motor actuator (hereinafter simply referred to as "actuator" also) is conventionally used as a drive source for various mechanical devices. The actuator includes a housing and an electric motor contained in the housing. The rotational speed of the electric motor is reduced by a plurality of reduction gears, then the rotation thereof is transmitted to an output shaft 22, and the motive power is outputted from the output shaft.

In this type of actuator, the operating noise of the electric motor becomes a noise source and therefore a countermeasure for reducing the noise is required when the actuator is used under environment where low noise level is required. The reference (1), in the following related art list, includes such an example where an O-ring having a vibration resistance is attached to a part of an electric motor and the vibration propagating directly from the electric motor is absorbed by the O-ring.

RELATED ART LIST (1) Japanese Unexamined Patent Application Publication No. Hei08-154358.

The structure implemented in the reference (1) suppresses the occurrence of noise to a certain degree. However, the following knowledge had been gained by the inventors of the present invention through their investigations. That is, any countermeasure concerning the vibration that air-propagates from the electric motor is not taken at all in the reference (1) and there is room for further improvement in terms of suppressing the occurrence of noise.

SUMMARY OF THE INVENTION

The present embodiment has been made to solve such problems, and one of purposes thereof is to provide a motor actuator that effectively suppresses the occurrence of noise.

In order to resolve the aforementioned problems, a motor actuator according to one embodiment of the present invention includes: a housing; and an electric motor contained in the housing, the electric motor having a motor casing and a motor shaft protruding from a front face of the motor casing, the housing having a back wall behind a rear face of the motor casing, wherein a gap space, which continues in a motor shaft direction, is formed between the back wall of the housing and the rear face of the motor casing, and wherein a counter region, which defines the gap space, is provided in the rear face of the motor casing, the motor actuator further including a sound insulating member placed in the gap space, and covers the counter region in its entirety from behind.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

During the course of explaining embodiments, some of members or components are omitted as appropriate in each Figure.

Figure 1:
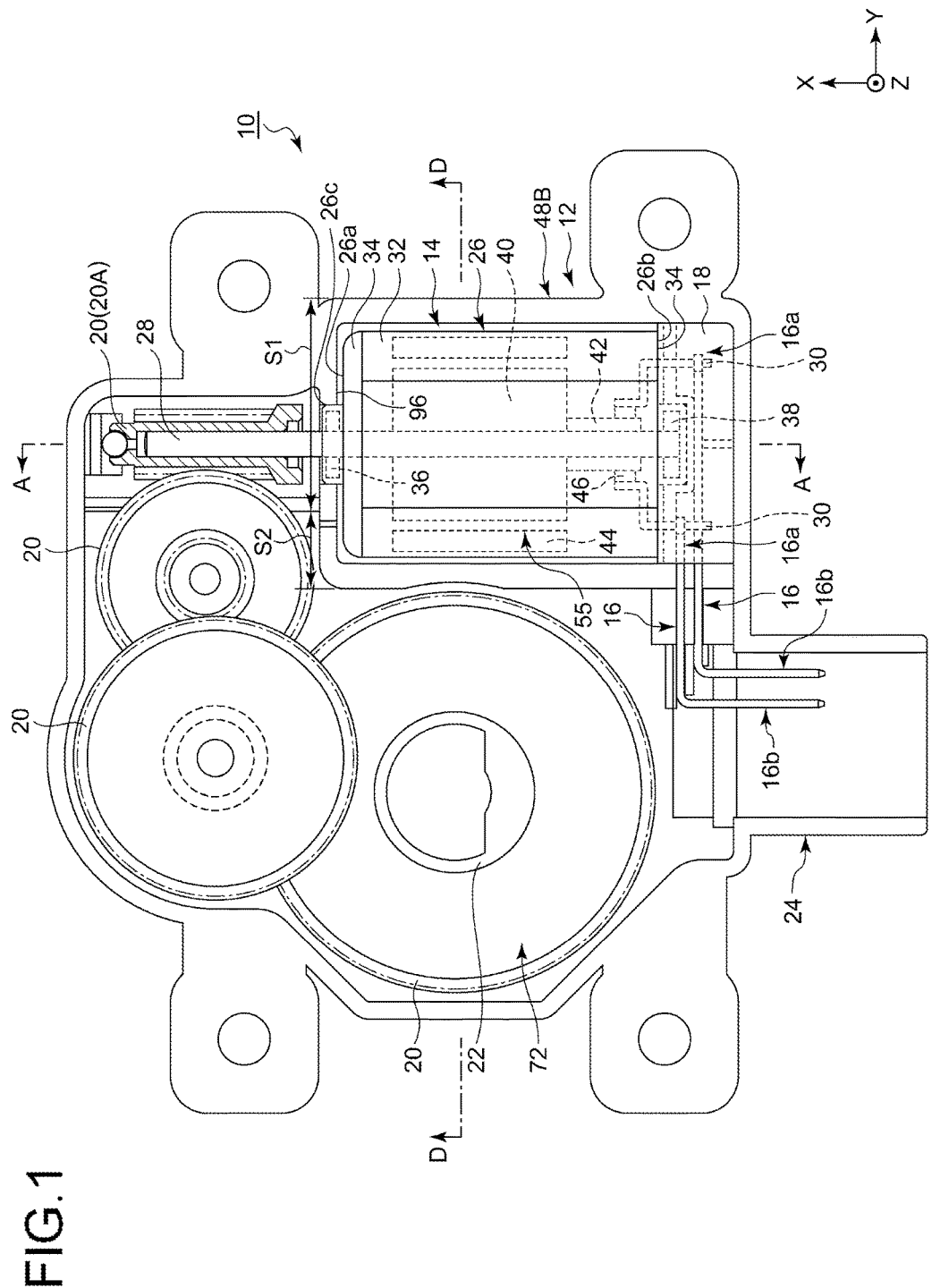
FIG. 1 is a plan view showing an internal structure of a motor actuator according to an embodiment.

FIG. 1 is a plan view showing an internal structure of an actuator 10 according to an embodiment. FIG. 1 shows an internal structure of a lower-side casing 48B (described later) of a housing 12.

The actuator 10 includes a housing 12, an electric motor 14, a plurality of terminals 16, and a sound insulating member 18. Hereinafter, a motor shaft direction, which is parallel to a motor shaft 28 (described later) of the electric motor 14, is referred to as a front-back direction X, and two shaft-orthogonal directions, which are orthogonal to the direction X are referred to as a horizontal direction Y and a height direction Z, respectively. Note that the direction Y and direction Z are orthogonal to each other.

The housing 12 is formed of a resin material, for instance. Internal components, such as the electric motor 14, a plurality of reduction gears 20 and an output shaft 22, are contained in the housing 12. A cylindrically-shaped connector part 24 is provided on a lateral portion of the housing 12. An external connector (not shown) is attached to the connector part 24. A detailed description of the housing 12 will be given later.

The electric motor 14 is a DC (direct-current) motor with brushes and has a motor casing 26 and a motor shaft 28. The motor casing 26 includes a cylindrical casing body 32 and brackets 34 that close up both front and rear sides of the casing body 32; the brackets 34 on both the front and rear sides thereof constitute a front face 26a and a rear face 26b of the motor casing 26.

The motor shaft 28 protrudes frontward from the front face 26a of the motor casing 26. A front-side projection 26c projecting forward from the front face 26a is provided in the motor casing 26. An outer periphery of the front-side projection 26c is formed in a circular shape. A front-side shaft bearing 36 is built into the front-side projection 26c in a position coaxial with the motor shaft 28.

Figure 2A:
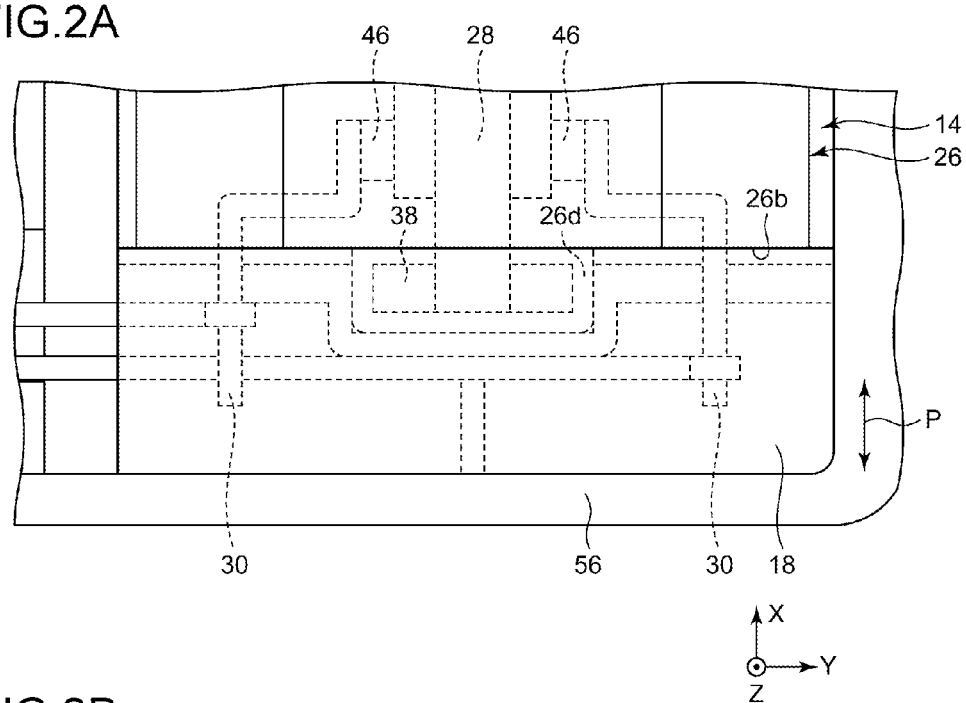
FIG. 2A is an enlarged plan view showing a neighborhood of a rear face of a motor actuator according to an embodiment.
Figure 2B:
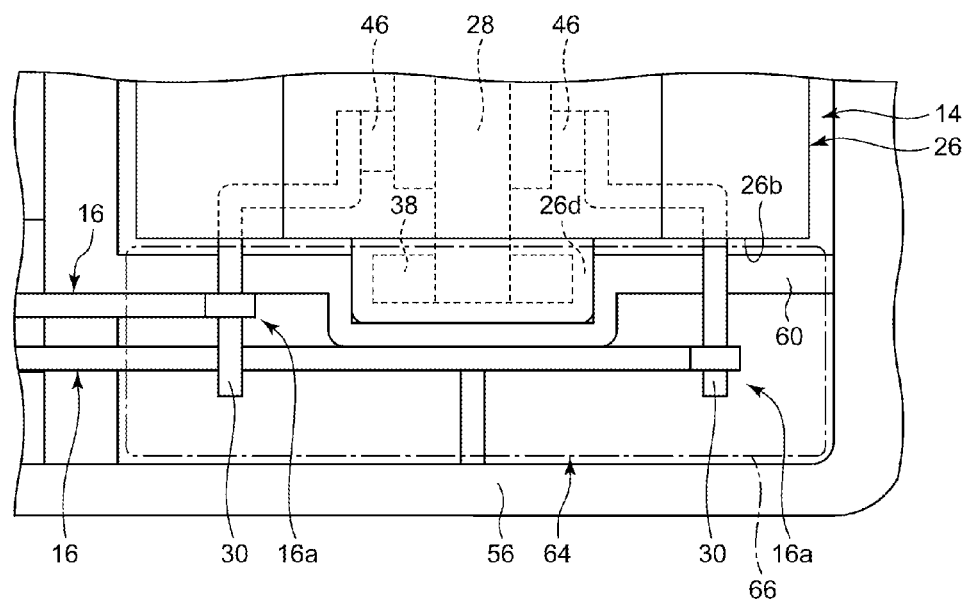
FIG. 2B shows the neighborhood of a rear face of a motor actuator with a sound insulating member removed from FIG. 2A.

FIGS. 2A and 2B are each an enlarged plan view showing a neighborhood of the rear face 26b of the motor casing 26. FIG. 2A shows a state where the sound insulating member 18 is assembled. FIG. 2B shows a state where the sound insulating member is removed.

A rear-side projection 26d projecting rearward from the rear face 26b is provided in the motor casing 26. An outer periphery of the rear-side projection 26d is formed in a circular shape. A rear-side shaft bearing 38 is built into the rear-side projection 26d in a position coaxial with the motor shaft 28. The motor shaft 28 is freely rotatably supported by the front-side shaft bearing 36 and the rear-side shaft bearing 38. A plurality of motor terminals 30 protruding rearward from the rear face 26b are provided in the motor casing 26. Each motor terminal 30 is electrically connected to a brush 46 (described later), inside the motor casing 26, and functions as a power supply terminal for supplying electricity to a coil (described later).

As shown in FIG. 1, a rotor 40, a commutator 42, a stator 44 and a brush 46 are placed and held inside the motor casing 26. The rotor 40 and the commutator 42 rotate together with the motor shaft 28, and the stator 44 is fixed inside the motor casing 26. The brushes 46 are placed in a rear portion of the motor casing 26, and slide on the outer peripheral surface of the commutator 42.

As the current is supplied to the motor terminals 30 from an external power supply, the current is applied to the coil (not shown) of the rotor 40 from the motor terminals 30 through the brush 46 and the commutator 42. The motor shaft 28 rotates together with the rotor 40 by the interaction between the magnetic field produced by the electric conduction of the coil and the magnetic field of a magnet of the stator 44. The rotational speed of the motor shaft 28 is reduced by the plurality of reduction gears 20 and then the rotation thereof is transmitted to the output shaft 22.

The terminals 16 are each constituted by an electric conductor, such as a wire rod having an electric conductivity, and are used to connect the motor terminals 30 and an external device or equipment such as the external power supply. The terminals 16 are so provided as to correspond respectively to the plurality of motor terminals 30. As shown in FIG. 2B, one end 16a of each terminal 16 is mechanically connected to a corresponding motor terminal 30 by a solder or the like, and electrically conducts with the motor terminal 30. As shown in FIG. 1, the other end 16b thereof is placed inside the connector part 24. When, an external connector (not shown) is mounted inside the connector part 24, the other end 16b of a terminal 16 is electrically connected to the external device by way of an external terminal (not shown) provided in the external connector.

Figure 3:
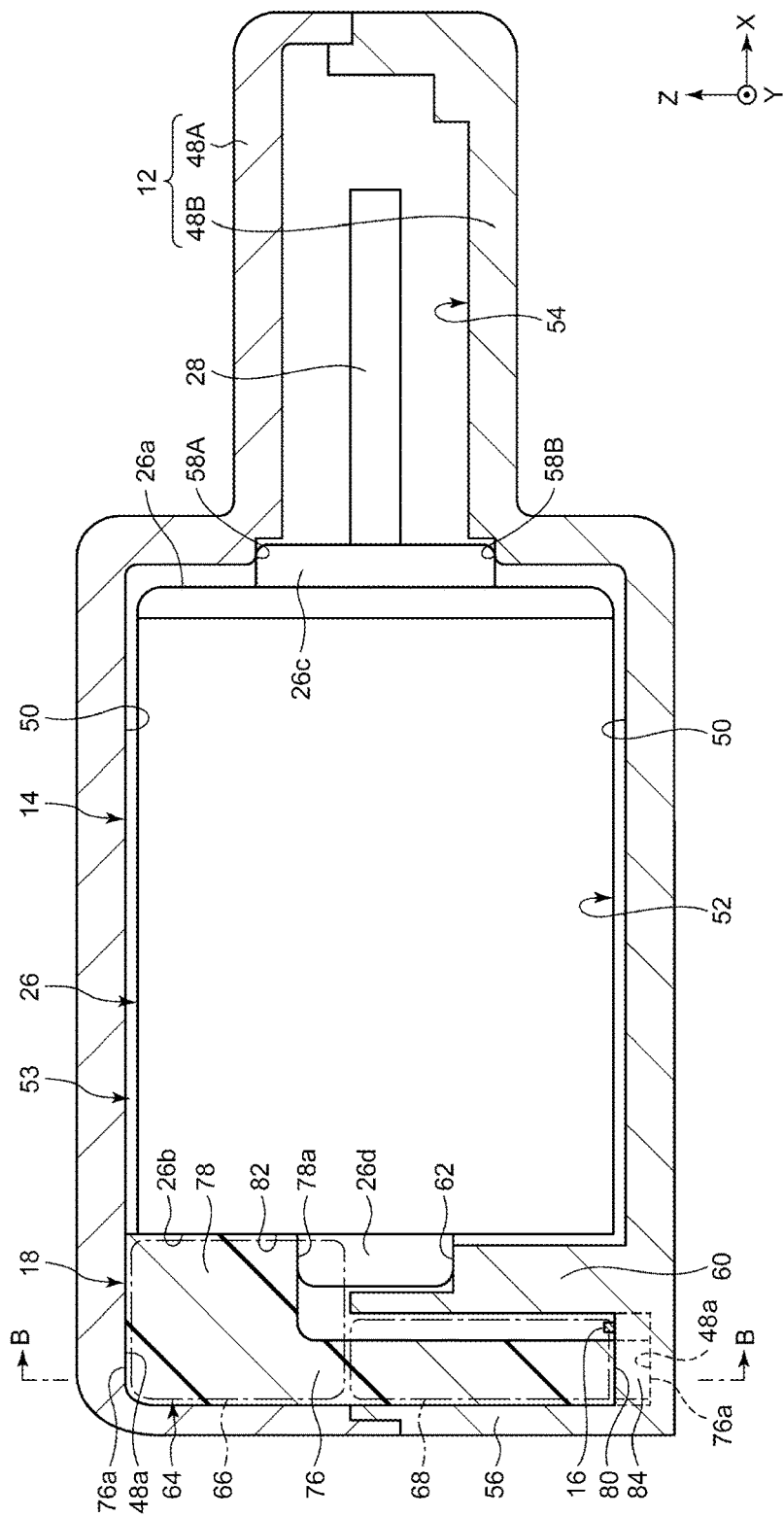
FIG. 3 is a cross-sectional view taking along the line A-A of FIG. 1.

FIG. 3 is a cross-sectional view taking along the line A-A of FIG. 1. FIG. 3 shows only an appearance of the electric motor 14 and omits the internal structure thereof. FIG. 3 also omits a worm gear 20A (see FIG. 1), which is mounted coaxially to the motor shaft 28 of the electric motor 14 and which serves as a reduction gear 20.

The housing 12 is constituted by an upper-side casing 48A, which serves as a first split divided body, and a lower-side casing 48B, which serves as a second divided body. The upper-side casing 48A and the lower-side casing 48B are of a shape such that the housing 12 is divided in the height direction Z. The casings 48A and 48B are placed respectively on both sides, respectively, in/along of the height direction Z where the electric motor 14 is held between the casings 48A and 48B; inner bottoms 50 are respectively provided, on the upper-side casing 48A and the lower-side casing 48B, in positions counter to each other in the height direction Z.

The housing 12 has a case holding section 52 for containing the motor casing 26 and a shaft holding section 54 for containing the motor shaft 28. Also, the housing 12 has a back wall 56 behind the rear face 26b of the motor casing 26. The back wall 56 constitutes a shield (outer shell) of the housing 12 and is so provided as to cover the entire rear face 26b from behind.

A first front-side fixing portion 58A and a second front-side fixing portion 58B are provided in the upper-side casing 48A and the lower-side casing, respectively, and are provided in positions, facing the front-side projection 26c of the electric motor 14 in the height direction Z. The first front-side fixing portion 58A and the second front-side fixing portion 58B are each configured by a groove, which is dented in the height direction Z located away from the front-side projection 26c, and are each formed in a shape such that the front-side projection 26c is fitted to it. The first front-side fixing portion 58A and the second front-side fixing portion 58B each fixes a front-side section of the motor casing 26 relative to the housing 12 by holding the front-side projection 26c therebetween from the height direction Z.

A first inner wall 60, which protrudes from the inner bottom 50 of the lower-side casing 48B toward the inner bottom 50 of the upper-side casing 48A, is provided in the housing 12. The first inner wall 60 has a second rear-side fixing portion 62 in a position facing the rear-side projection 26d of the motor casing 26 in the height direction Z. The second rear-side fixing portion 62 is configured by a groove, which is dented in the height direction Z located away from the rear-side projection 26d, and is formed in a shape such that the rear-side projection 26d is fitted to the second rear-side fixing portion 62.

Figure 4:
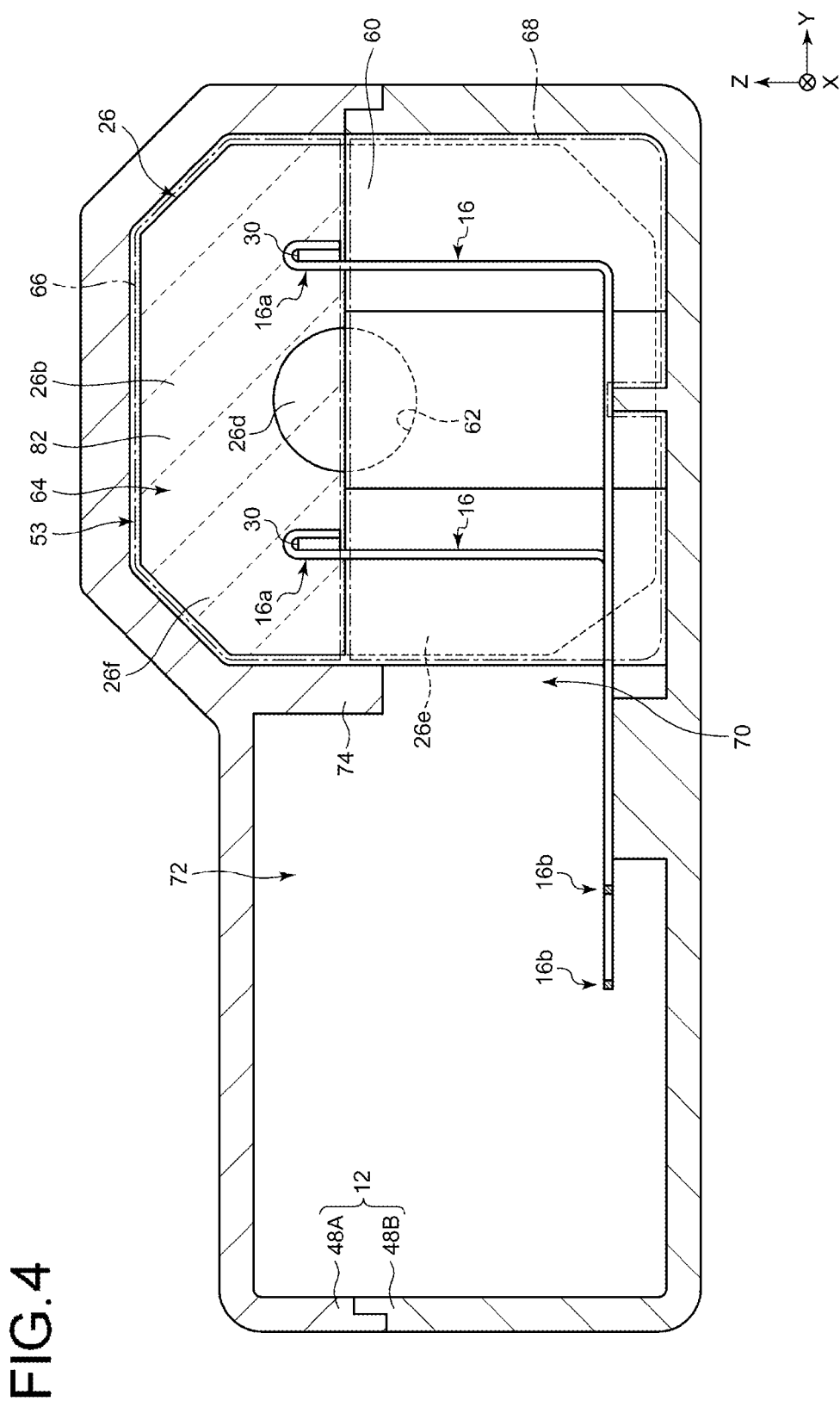
FIG. 4 is a cross-sectional view taking along the line B-B of FIG. 3 with a sound insulating member omitted.

FIG. 4 is a cross-sectional view taking along the line B-B of FIG. 3 with the sound insulating member 18 omitted.

When viewed from the front-back direction X, the first inner wall 60 partially overlaps with the rear face 26b of the motor casing 26. The rear face 26b of the motor casing 26 is provided such that a lower-side part 26e, which constitutes a part thereof in the height direction Z, is covered with the first inner wall 60 from behind and such that an upper-side part 26f extends upward outside the first inner wall 60. A motor terminal 30 projects rearward from this upper-side part 26f.

As shown in FIG. 3 and FIG. 4, the case holding section 52 of the housing 12 is of a shape according to the external form of the motor casing 26 such that a constant gap 53 can be formed between the outer periphery of the motor casing 26.

In the case holding section 52 of the housing 12, as shown in FIG. 3, a rearward space 64 is formed between the back wall 56 of the housing 12 and the rear face 26b of the motor casing 26. The rearward space 64 includes a gap space 66 and a between-walls space 68. Here, the gap space 66 continues, in the front-back direction X, between the back wall 56 of the housing 12 and the rear face 26b of the motor casing 26; the between-walls space 68 is formed between the first inner wall 60 and the back wall 56 of the housing 12. In FIG. 2B, FIG. 3 and FIG. 4, an area where the gap space 66 is formed is indicated by a dashed-dotted line; in FIG. 3 and FIG. 4, an area where the between-walls space 68 is formed is also indicated by a dashed-dotted line. The between-walls space 68 is formed continuously in such a manner as to extend and spread from the gap space 66 in the height direction Z.

As shown in FIG. 4, a drawn-out space 70 is so formed as to extend and spread from the rearward space 64 in the horizontal direction Y, inside the housing 12. In the drawn-out space 70, other end side portions of the terminals 16 are led from the rearward space 64. Inside the housing 12, a second internal space 72 (described later) is formed in a position farther shifted from the drawn-out space 70 relative to the rearward space 64. Internal components excluding the electric motor 14 are contained within the second internal space 72. These internal components other than the electric motor 14 include the plurality of reduction gears 20, the output shaft and so forth. A partition wall 74, which partially partitions the region between the rearward space 64 and the second internal space 72 is provided in the upper-side casing 48A.

As shown in FIG. 3, the sound insulating member 18 is set between the back wall 56 of the housing 12 and the rear face 26b of the motor casing 26. The sound insulating member 18 is placed in the rearward space 64 including the gap space 66.

Figure 5A:
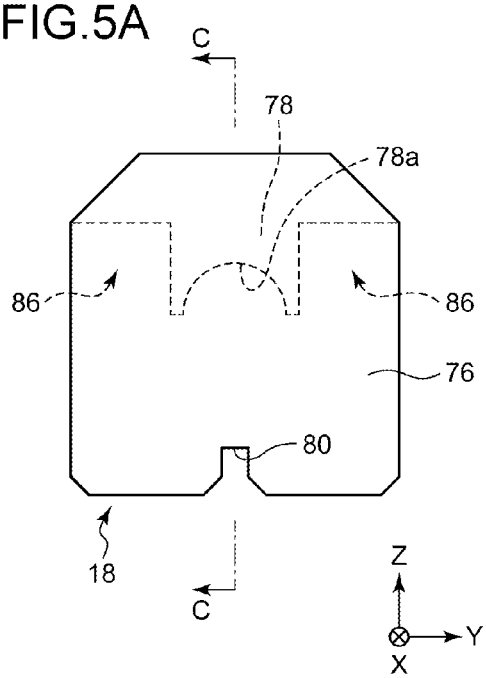
FIG. 5A is a rear view of a sound insulating member, according to an embodiment, as viewed from a rear side thereof.
Figure 5B:
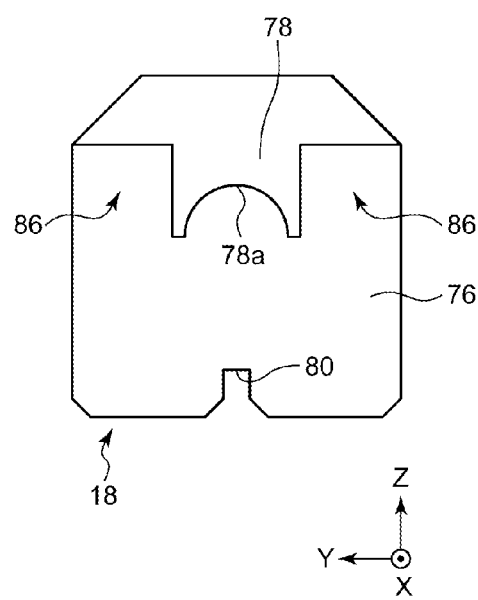
FIG. 5B is an entire view of a sound insulating member as viewed from a front side thereof.
Figure 5C:
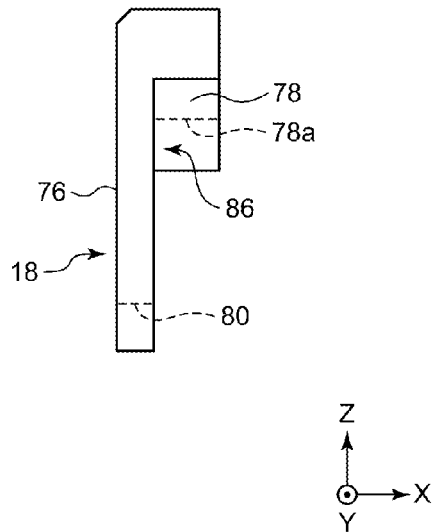
FIG. 5C is a side view of a sound insulating member as viewed from a right side of FIG. 5A.
Figure 5D:
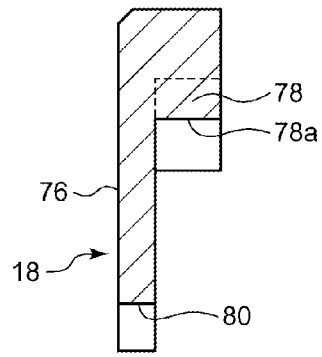
FIG. 5D is a cross-sectional view taken along the line C-C of FIG. 3.

FIGS. 5A to 5D each shows the sound insulating member 18. FIG. 5A is a rear view of the sound insulating member 18 as viewed from a rear side thereof (left side of FIG. 3). FIG. 5B is a front of the sound insulating member 18 as viewed from a front side thereof (right side of FIG. 3). FIG. 5C is a side view of the sound insulating member 18 as viewed from a right side of FIG. 5A. FIG. 5D is a cross-sectional view taken along the line C-C of FIG. 3. The sound insulating member 18 has a cover 76, a first rear-side fixing portion 78, and a positioning portion 80. The sound insulating member 18 is constructed of a material having elasticity in its entirety, such as rubber. Thus, the sound insulating member 18 is configured such that a part of the sound insulating member 18 including the cover 76 and the first rear-side fixing portion 78 is formed of an elastic material.

Figure 6:
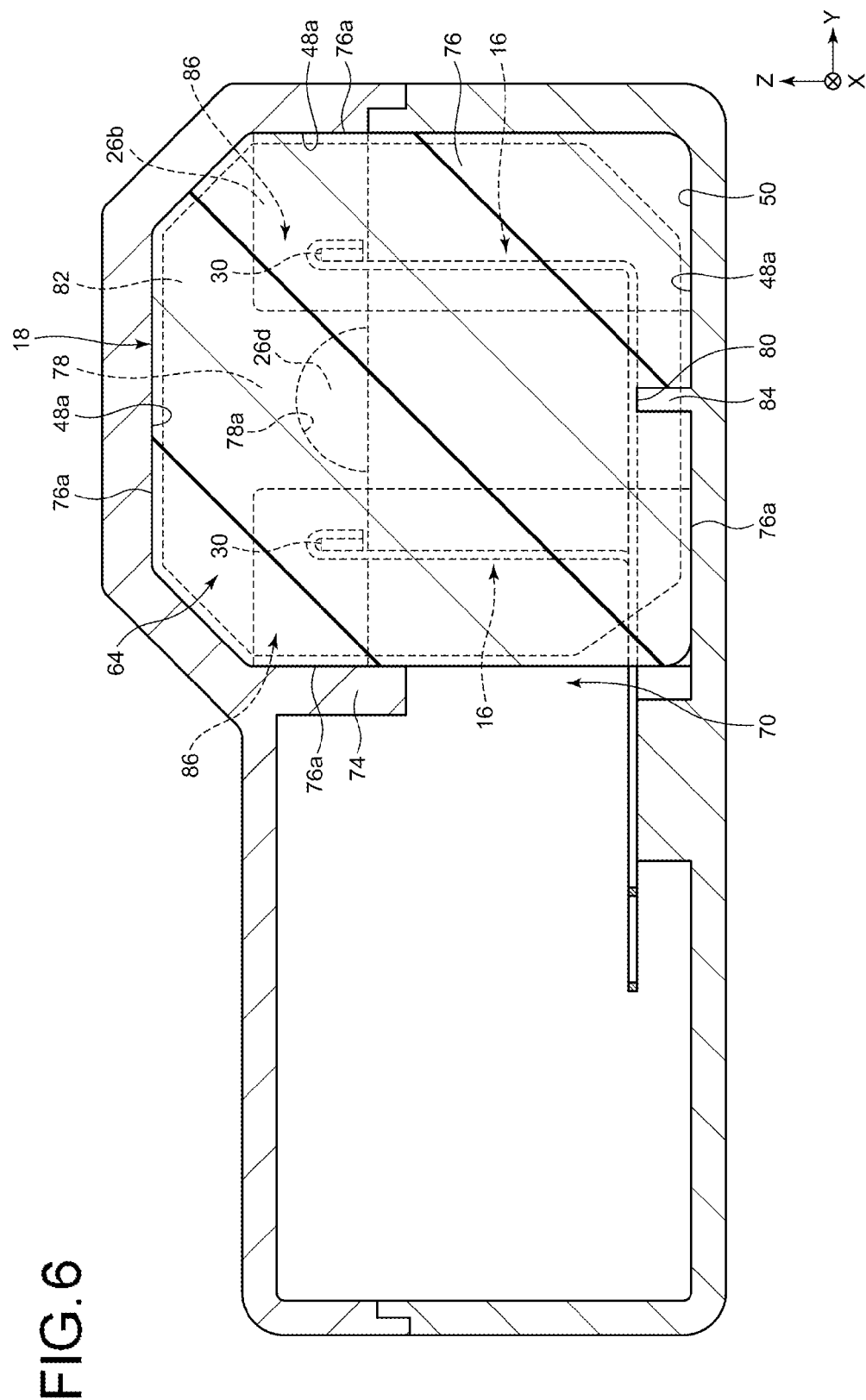
FIG. 6 is a cross-sectional view taken along the line B-B of FIG. 3.

FIG. 6 is a cross-sectional view taken along the line B-B of FIG. 3.

The cover 76 of the sound insulating member 18 is so provided as to cover the whole rear face 26b of the motor casing 26 from behind. Here, as a region that defines the gap space 66, a counter region 82 is provided in the rear face 26b of the motor casing 26. In FIG. 4, the range where the counter region 82 is formed is indicated by broken-line hatching. As shown in FIG. 4 and FIG. 6, the cover 76 is so provided as to cover the entire counter region 82 of the motor casing 26 from behind. Also, as shown in FIG. 3, the cover 76 is provided such that the gap space 66 located on a linear path in the front-back direction X leading to the back wall 56 of the housing 12 from the rear face 26b of the motor casing 26 is embedded in an at least part of the range in the front-back direction X. In this case, as shown in FIG. 6, the cover 76 is in contact with an inner wall surface 48a, which is surrounding an outer periphery 76a of the cover 76, of the upper-side casing 48A and the lower-side casing 48B. Note that the outer periphery 76a of the cover 76 is composed of four circumferential parts in the horizontal direction Y and the height direction Z. The inner wall surface 48a is a wall surface, which is located nearer the rearward space 64 than the partition wall 74 and which defines the rearward space 64. Thus, the cover 76 is formed into a shape such that the vibration, which directly air-propagates from the rear face 26b of the motor casing 26 to the back wall 56 of the housing 12 through the gap space 66 in the front-back direction X, can be blocked.

As shown in FIG. 3, the first rear-side fixing portion 78 is formed in such a manner as to protrude from the cover 76 of the sound insulating member 18 toward the counter region 82 of the rear face 26b of the motor casing 26. The first rear-side fixing portion 78 has a fitting portion 78a in a position facing the rear-side projection 26d of the motor casing 26 in the height direction Z (see FIG. 5 and FIG. 6). The fitting portion 78a is configured by a groove, which is dented in the height direction Z located away from the rear-side projection 26d, and is formed in a shape such that the rear-side projection 26d is fitted to the fitting portion 78a.

The first rear-side fixing portion 78 is held by and between the upper-side casing 48A and the rear-side projection 26d of the motor casing 26 in the height direction Z; the rear-side projection 26d of the motor casing 26 is held between the first rear-side fixing portion 78 of the sound insulating member 18 and the second rear-side fixing portion 62 of the lower-side casing 48B. Thereby, a rear-side portion of the motor casing 26 is fixed to the housing 12. In this manner, the motor casing 26 is fixed in a state where the front-side projection 26c and the rear-side projection 26d of the motor casing 26 is being held between the upper-side casing 48A and the lower-side casing 48B in the height direction Z, and the components of the motor casing 26 other than the front-side projection 26c and the rear-side projection 26d are kept in a floating state where those components are not in contact with the upper-side casing 48A and the lower-side casing 48B.

As shown in FIG. 3 and FIG. 6, the positioning portion 80 is formed on a side part of the cover 76 in one side of the height direction Z; in the inner bottom 50 of the lower-side casing 48B, an engagement portion 84 is formed in a position facing the positioning portion 80 in the height direction Z. The positioning portion 80 is configured as a groove-like recess that extends in the front-back direction X, whereas the engagement portion 84 can be fitted to the positioning portion 80 and is configured as a projected protrusion that extends in the front-back direction X. The positioning portion 80 is provided for the purposes of positioning the sound insulating member 18 relative to the rear face 26b of the motor casing 26. Specifically, the positioning portion 80 determines the position of the sound insulating member 18 in the horizontal direction Y and the orientation relative to the rear face 26b of the motor casing 26, through the engagement with the engagement portion 84 of the lower-side casing 48B, which is a member different from the sound insulating member 18. As shown in FIG. 2B, the "orientation" as meant here is a direction in which a thick direction P of the sound insulating member 18 points with respect to the shaft direction X of the motor shaft 28 as the sound insulating member 18 is viewed from the height direction Z. As described above, the positioning portion 80 positions the sound insulating member 18 relative to the rear face 26b of the motor casing 26 so that the cover 76 can cover the whole counter region 82 of the motor casing 26 from behind.

As shown in FIG. 3 and FIG. 6, the cover 76 is provided behind the terminals 16 such that the terminals 16 can pass through the drawn-out space 70 from the rearward space 64 of the housing 12. As shown in FIG. 5B and FIG. 5C, the sound insulating member 18 has a dent portion 86, which is dented rearward than the first rear-side fixing portion 78 (left side of FIG. 5C), on the both sides of the first rear-side fixing portion 78 in the horizontal direction Y. As shown in FIG. 6, the dent portion 86 is disposed opposite to the motor terminal 30 of the electric motor 14 in the front-back direction X; the dent portion 86 is formed for the purpose of preventing the motor terminals 30 from coming in contact with the cover 76.

The above-described sound insulating member 18 is secured in a state where the cover 76 and the first rear-side fixing portion 78 are held by and between the upper-side casing 48A and the lower-side casing 48B and where the sound insulating member 18 is positioned by the positioning portion 80. At this time, whole of the sound insulating member 18 including the cover 76 and the first rear-side fixing portion 78 is kept in an elastically deformed state in the height direction Z by being held between the upper-side casing 48A and the lower-side casing 48B.

A description is now given of an exemplary method for assembling the above-described actuator 10.

The electric motor 14, each reduction gear 20 and the terminals 16 are first assembled inside the lower-side casing 48. At this time, the front-side projection 26c and the rear-side projection 26d of the motor casing 26 are supported by the second front-side fixing portion 58B and the second rear-side fixing portion 62 of the lower-side casing 48B, respectively.

Then, the sound insulating member 18 is assembled inside the lower-side casing 48B. While the first rear-side fixing portion 78 of the sound insulating member 18 is placed on the rear-side projection 26d of the motor casing 26, the positioning portion 80 of the sound insulating member 18 and the engagement portion 84 of the lower-side casing 48 are engaged with each other so as to position the sound insulating member 18 relative to the rear face 26b of the motor casing 26. Further, the sound insulating member 18 is secured to the lower-side casing 48B by fitting the positioning portion 80 and the engagement portion 84.

As described above, the sound insulating member 18 has the positioning portion 80. This allows the sound insulating member 18 to be easily arranged in a proper positional relation when the sound insulating member 18 is to be assembled inside the lower-side casing 48B, thereby improving the operability during the assembling. Assume that no positioning portion 80 is provided. Since, in this case, the outer periphery of the rear-side projection 26d is circular in shape, the rotational position of the sound insulating member 18 around the rear-side projection 26d is less likely to be determined when the first rear-side fixing portion 78 is placed on the rear-side projection 26d of the motor casing 26. In this respect, by employing the present embodiment, the rotational position of the sound insulating member 18 is easily determined by the positioning portion 80 of the sound insulating member 18, so that the operability during the assembling can be further improved when the first rear-side fixing portion 78 is to be provided.

Finally, the upper-side casing 48A is assembled to the lower-side casing 48B. This completes the assembly of the actuator 10. At this time, the front-side section of the motor casing 26 is fixed to the housing 12 by holding the front-side projection 26c between the front-side fixing portions 58A and 58B of the casings 48A and 48B, respectively, from the height direction Z. Also, the rear-side section of the motor casing 26 is fixed to the housing 12 by holding the rear-side projection 26d between the first rear-side fixing portions 78 of the sound insulating member 18 and the second rear-side fixing portion 62 of the lower-side casing 48B, from the height direction Z. Here, when the cover 76 and the first rear-side fixing portion 78 are held by and between the upper-side casing 48A and the lower-side casing 48B, a compression force is intruded and thereby the sound insulating member 18 becomes elastically deformed.

By employing the above-described actuator 10, the sound insulating member 18, which is arranged in the gap space 66 between the back wall 56 of the housing 12 and the rear face 26b of the motor casing 26, covers the entire counter region 82 of the rear face 26b of the motor casing 26 from behind. Thus, the vibration, which air-propagates starting from the rear face 26b of the motor casing 26 up to the back wall 56 of the housing 12 through the gap space 66, is blocked by the sound insulating member 18. As a result, the occurrence of noise generated from the back wall 56 of the housing 12 to the exterior is effectively suppressed.

If, in particular, the electric motor 14 with brushes is used, the brushes, which are vibration sources, are normally placed in a position near the rear face 26b of the motor casing 26 where the motor terminal 30 protrude. For this reason, the vibration having a large amplitude is more likely to be produced from the rear face 26b of the motor casing 26. In the present embodiment, the air propagation of the vibration occurring from the rear face 26b of the motor casing 26 is blocked off by the sound insulating member 18. As a result, the noise produced from the housing 12 is effectively suppressed in particular.

Also, the sound insulating member 18 has the first rear-side fixing portion 78, which fixes the motor casing 26 to the housing 12. Thus, the following advantageous effect is achieved. In the conventional practice, a rear-side fixing portion is integrally formed with each of the upper-side casing 48A and the lower-side casing 48B by using an integral molding process; the motor casing 26 is fixed to the housing 12 by holding the rear-side projection 26d of the electric motor 14 by this rear-side fixing portions. In contrast to this, according to the present embodiment, the first rear-side fixing portion 78 is provided, in the sound insulating member 18, separately from the upper-side casing 48A. Thus, in case of securing the motor casing 26 to the housing 12, the vibration, which directly propagates from the motor casing 26 to the upper-side casing 48A, is suppressed. Hence, the vibration can be transmitted to the upper-side casing 48A through the rear-side fixing portion 78 of the sound insulating member 18 after the vibration propagated from the motor casing 26 has been absorbed therethrough. As a result, the occurrence of noise generated from the motor casing 26 to the exterior is effectively suppressed.

In particular, the sound insulating member 18 is made of a material having elasticity. Thus, the first rear-side fixing portion 78 is compressed and deformed by holding the sound insulating member 18 between the housing 12 and the motor casing 26. Generally, the vibration absorption effect achieved by the sound insulating member is more satisfactory when soft material is used than when hard material is used. Also, the vibration absorption effect will be greater when a larger elastic repulsion force is exerted. Thus, by employing the present embodiment, the vibration absorption effect by the rear-side fixing portion 78 of the sound insulating member 18 becomes particularly excellent. Hence, the vibration can be transmitted to the upper-side casing 48A after the vibration propagated from the motor casing 26 has been effectively absorbed through the first rear-side sixing portion 78. As a result, the occurrence of noise generated from the motor casing 26 to the exterior is further effectively suppressed.

The actuator 10 according to the present embodiment employs the following structurally devised features as additional or further effective countermeasures to reduce the noise.

Figure 7:
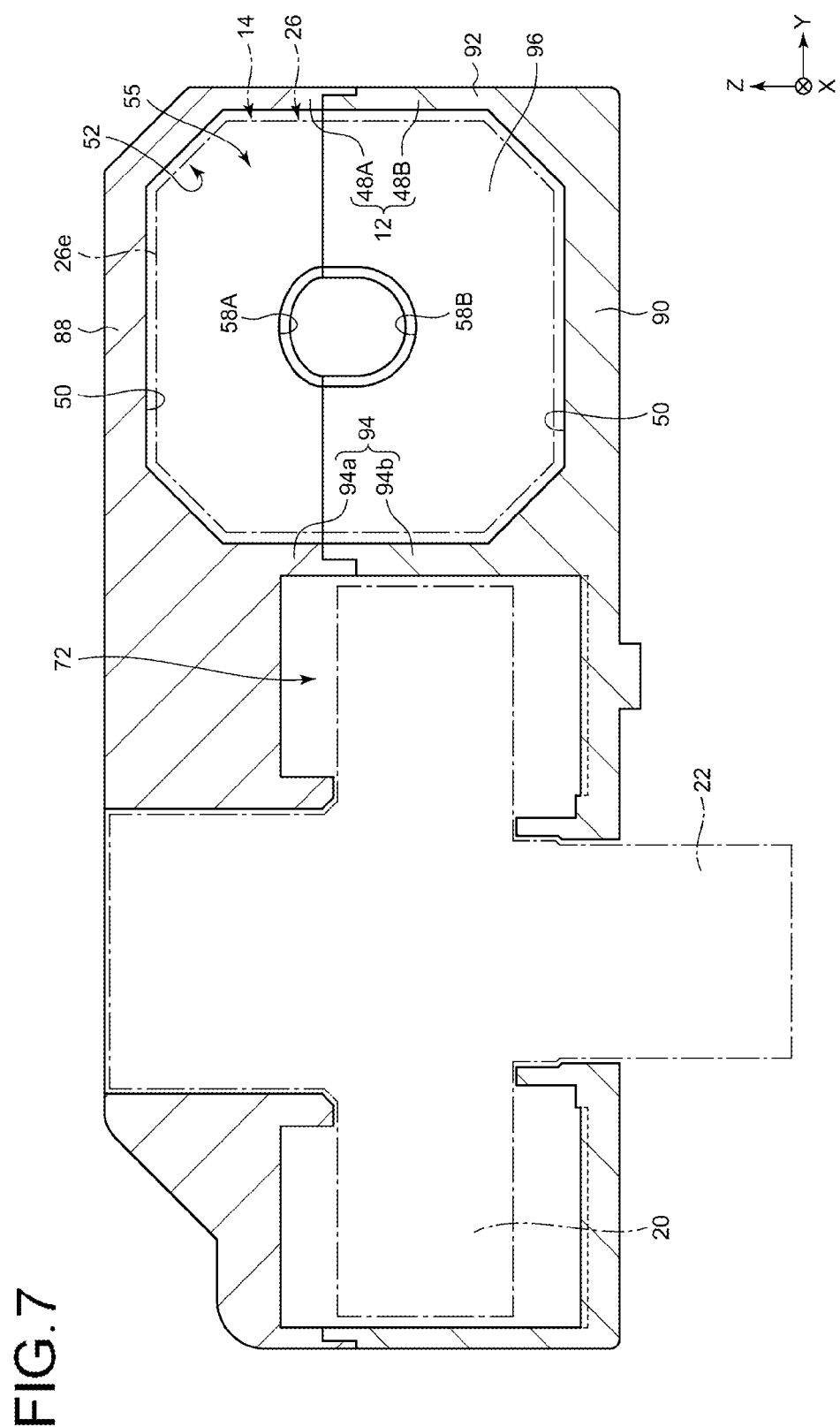
FIG. 7 is a cross-sectional view taken along the line D-D of FIG. 1.

FIG. 7 is a cross-sectional view taken along the line D-D of FIG. 1. FIG. 1 omits the electric motor 14, the reduction gears 20, the output shaft 22 and so forth.

The housing 12 has walls 88, 90, 92 and 94 surrounding all over the entire outer periphery 26e of the motor casing 26 from outside. The walls 88, 90, 92 and 94 include an upper wall 88, a lower wall 90, a side wall 92, and a second inner wall 94. Here, the upper wall 88 is provided above the outer periphery 26e of the motor casing 26. The lower wall 90 is provided below the outer periphery 26e thereof. The side wall 92 is provided on one side (right side in FIG. 7) of the outer periphery 26e. The second inner wall 94 is provided on the other side (left side in FIG. 7) of the outer periphery 26e. Each of the walls 88, 90, 92 and 94 surrounds the outer periphery 26e over the entire range of the front-back direction X and over the entire range of the height direction Z. The upper wall 88 covers the outer periphery 26e of the motor casing 26 from above, the lower wall 90 covers it from below, the side wall 92 covers it from one side, and the second inner wall 94 covers from the other side.

The upper wall 88, the lower wall 90 and the side wall 92 constitute the shield (outer shell) of the housing 12. The second inner wall 94 is constituted by wall parts 94a and 94b protruding from the inner bottoms 50 of the upper-side casing 48A and the lower-side casing 48B, respectively. The second inner wall 94 separates a first internal space 55, which is formed inside the case holding section 52 for holding the motor casing 26, and a second internal space 72, which is formed, within the housing 12, separated from the first internal space 55. As described earlier, the internal components, including the plurality of reduction gears 20 and the output shaft 22, are contained in the second internal space 72.

By employing the above-described structure and arrangement, while the entire counter region 82 of the rear face 26b of the motor casing 26 is covered by the sound insulating member 18 from behind, the outer periphery 26e of the motor casing 26 is surrounded by the walls 88, 90, 92 and 94 of the housing 12. Thus, the air propagation of the vibration occurring from the motor casing 26 is blocked off by not only the sound insulating member 18 but also the walls 88, 90, 92 and 94. This is more likely to prevent the leakage of the vibration to the exterior of the first internal space 55. Since, in particular, the air propagation of the vibration to the relatively wide second internal space 72, which contains the reduction gears 20 and so forth, is blocked by the second inner wall 94, the range in which the vibration propagates through air is easily kept inside the first internal space 55. Hence, even though the gap through which the external space and the second internal space 72 are communicated with is located in the connector part 24 of the housing 12 or the like, the direct leakage of the vibration to the exterior space from the second internal space 72 is prevented, so that the further effective counter-measurement to reduce the noise can be achieved.

As shown in FIGS. 1, 3 and 7, the housing 12 further includes a front wall 96 which is arranged around the motor shaft 28 and covers a region, which is provided on the front face 26a of the motor casing 26 around the motor shaft 28, from a front side. The front wall 96 is such that a range S1 (see FIG. 1), which is a part of the horizontal direction Y, constitutes the shield (shell) of the housing 12. Also, the front wall 96 is such that a range S2 (see FIG. 1), which is another part of the horizontal direction Y, separates the first internal space 55 and the second internal space 72. The front wall 96 also blocks the air propagation of the vibration into the second internal space 72 and thereby the range in which the vibration propagates through air is easily kept inside the first internal space 55.

While the preferred embodiments of the present invention have been described using specific terms, such description is for the purpose of only illustrating the principle and applications of the present invention, and it is to be understood that modifications or changes and variations in arrangement may be further made without departing from the spirit or scope of the appended claims that underlie the technical ideas of the present invention.

The description has been given of an exemplary case where the electric motor 14 is the DC motor with brushes; instead, a DC motor without brushes may be used, and a stepping motor or the like other than the DC motor may be used. Also, an O-ring may be mounted to enhance the vibration resistance, in the front-side projection 26c and/or the rear-side projection 26d. The O-ring may be formed of an elastic material.

An example has been shown where the sound insulating member 18 is such that the first rear-side fixing portion 78 is in contact with the motor casing 26 and then the vibration of the motor casing 26 is directly transmitted to the sound insulating member 18. If, in this case, the sound insulating member 18 is formed of a hard material, abnormal noise is more likely to occur due to a backlash or the like of the sound insulating member 18 within the housing 12. Thus, in such a case, the sound insulating member 18 may be entirely constituted by and formed of an elastic material in terms of suppressing the abnormal noise, caused by the backlash, by absorbing the vibration propagating in the sound insulating member 18.

In addition to the above, the sound insulating member 18 may be configured such that the sound insulating member 18 has the cover 76 without the first rear-side fixing portion 78 and is arranged in a position spaced away from the motor casing 26. In this case, the vibration of the motor casing 26 is not directly propagated to the sound insulating member 18 and therefore the abnormal sound due to the backlash or the like of the sound insulating member 18 within the housing 12 is less likely to occur. In this case, therefore, the sound insulating member 18 may be formed of a hard material using a resin or the like besides the elastic material.

Though the cover 76 of the sound insulating member 18 is so provided as to cover the entire rear face 26b of the motor casing 26 from behind, the cover 76 thereof may be so provided as to cover at least the entire counter region 82 of the rear face 26b from behind. Though the cover 76 comes in contact with the inner wall surfaces 48a of the upper-side casing 48A and the lower-side casing 48B, the cover 76 may not be in contact with any of the inner wall surfaces 48a thereof or may be in contact with only the inner wall surface 48a of the upper-side casing 48A.

The first rear-side fixing portion 78 of the sound insulating member 18 is held by and between the upper-side casing 48A and the rear-side projection 26d of the motor casing 26 and, thereby, the rear-side portion of the motor casing 26 is fixed to the housing 12. However, the position in which they are held thereby and therebetween should not be considered as limiting. For example, the first rear-side fixing portion 78 of the sound insulating member 18 may be held by and between the upper-side casing 48 and the outer periphery of the motor casing 26, in the height direction Z. In any case, the first rear-side fixing portion 78 may be held by and between the upper-side casing 48A and the motor casing 26, in the height direction Z.

The description has been given of an exemplary case where the positioning portion 80 of the sound insulating member 18 is a recess while the engagement portion 84 of the lower-side casing 48B is a protrusion. Instead, the positioning portion 80 may be a protrusion whereas the engagement portion 84 may be a recess. In other words, the positioning portion 80 of the sound insulating member 18 may be either a recess or a protrusion, and the engagement portion 84 of the lower-side casing 48B may be either a protrusion or a recess that can be fitted to the positioning portion 80.

What is claimed is:

1. A motor actuator comprising:
    a housing; and
    an electric motor contained in the housing,
    the electric motor having a motor casing and a motor shaft protruding from a front face of the motor casing,
    the housing having a back wall behind a rear face of the motor casing,
    wherein a gap space, which continues in a motor shaft direction, is formed between the back wall of the housing and the rear face of the motor casing, and
    wherein a counter region, which defines the gap space, is provided by the rear face of the motor casing,
    the motor actuator further comprising a sound insulating member placed in the gap space between the back wall of the housing and the rear face of the motor casing, and covers the counter region in its entirety from behind, and
    wherein the sound insulating member has a fixing portion that fixes the motor casing to the housing by being held between the housing and the motor casing in a direction orthogonal to the motor shaft.

2. A motor actuator according to claim 1, wherein the sound insulating member is constructed of a material having elasticity.

3. A motor actuator according to claim 1, wherein the sound insulating member has a positioning portion that positions the sound insulating member relative to the rear face of the motor casing through an engagement thereof with another member.

4. A motor actuator according to claim 1, wherein the sound insulating member has a positioning portion that positions the sound insulating member relative to the rear face of the motor casing through an engagement thereof with another member.

5. A motor actuator according to claim 2, wherein the sound insulating member has a positioning portion that positions the sound insulating member relative to the rear face of the motor casing through an engagement thereof with another member.

6. A motor actuator according to claim 1, wherein the housing has a wall that surrounds an outer periphery of the motor casing, and
    wherein the wall of the housing has an inner wall that separates a first internal space, where the motor casing is contained, and a second internal space, which is formed, within the housing, separately from the first internal space.

7. A motor actuator according to claim 1, wherein the housing has a wall that surrounds an outer periphery of the motor casing, and,
    wherein the wall of the housing has an inner wall that separates a first internal space, where the motor casing is contained, and a second internal space, which is formed, within the housing, separately from the first internal space.

8. A motor actuator according to claim 2, wherein the housing has a wall that surrounds an outer periphery of the motor casing, and,
    wherein the wall of the housing has an inner wall that separates a first internal space, where the motor casing is contained, and a second internal space, which is formed, within the housing, separately from the first internal space.

9. A motor actuator according to claim 3, wherein the housing has a wall that surrounds an outer periphery of the motor casing, and,
    wherein the wall of the housing has an inner wall that separates a first internal space, where the motor casing is contained, and a second internal space, which is formed, within the housing, separately from the first internal space.

* * * * *